US009842358B1

(12) United States Patent
Butler et al.

(10) Patent No.: US 9,842,358 B1
(45) Date of Patent: Dec. 12, 2017

(54) METHOD FOR PROVIDING PERSONALIZED RECOMMENDATIONS

(75) Inventors: Christopher Butler, San Francisco, CA (US); Brittania Boey, San Francisco, CA (US)

(73) Assignee: BrighTex Bio-Photonics LLC, San Jose, CA (US)

( * ) Notice: Subject to any disclaimer, the term of this patent is extended or adjusted under 35 U.S.C. 154(b) by 117 days.

(21) Appl. No.: 13/527,578

(22) Filed: Jun. 19, 2012

(51) Int. Cl.
*G06Q 30/00* (2012.01)
*G06Q 30/06* (2012.01)

(52) U.S. Cl.
CPC .............................. *G06Q 30/0631* (2013.01)

(58) Field of Classification Search
CPC ........................................ G06Q 30/06–30/08
USPC ................................................ 705/26.1–27.2
See application file for complete search history.

(56) References Cited

U.S. PATENT DOCUMENTS

| 6,293,284 | B1 | 9/2001 | Rigg |
| 6,571,003 | B1 * | 5/2003 | Hillebrand et al. .......... 382/118 |
| 6,922,523 | B2 | 7/2005 | Merola et al. |
| 7,376,346 | B2 | 5/2008 | Merola et al. |
| 7,454,046 | B2 | 11/2008 | Chhibber et al. |
| 7,477,767 | B2 | 1/2009 | Chhibber et al. |
| 7,522,768 | B2 | 4/2009 | Bhatti et al. |
| 7,634,538 | B2 | 12/2009 | Mori et al. |
| 7,809,601 | B2 | 10/2010 | Shaya et al. |
| 7,840,064 | B2 | 11/2010 | Chhibber et al. |
| 7,856,118 | B2 | 12/2010 | Kalla et al. |
| 7,894,651 | B2 | 2/2011 | Gutkowicz-Krusin et al. |
| 8,094,186 | B2 | 1/2012 | Fukuoka et al. |
| 8,131,029 | B2 | 3/2012 | Chhibber et al. |
| 8,155,413 | B2 | 4/2012 | Chhibber et al. |
| 2006/0129411 | A1 | 6/2006 | Bhatti et al. |
| 2006/0229912 | A1 | 10/2006 | Negishi et al. |
| 2007/0058858 | A1 | 3/2007 | Harville et al. |
| 2008/0275315 | A1 | 11/2008 | Oka et al. |
| 2009/0141956 | A1 | 6/2009 | Chibber et al. |
| 2010/0185064 | A1 | 7/2010 | Bandic et al. |
| 2010/0245823 | A1 | 9/2010 | Chhibber |
| 2010/0279718 | A1 | 11/2010 | Borve |
| 2010/0309300 | A1 | 12/2010 | Chhibber |
| 2010/0316296 | A1 | 12/2010 | Chhibber et al. |
| 2010/0329525 | A1 | 12/2010 | Goodman |
| 2011/0040571 | A1 | 2/2011 | Warren |

(Continued)

FOREIGN PATENT DOCUMENTS

| JP | 2004354207 | 12/2004 |
| JP | 2010199756 | 9/2010 |

OTHER PUBLICATIONS

Brightex Bio-Photonics, LLC, http://www.btbp.org/.

*Primary Examiner* — Ethan D Civan
(74) *Attorney, Agent, or Firm* — Kelley Drye & Warren LLP

(57) ABSTRACT

The present invention enables personalized recommendations for a user. In a preferred embodiment, a user submits an image of her face along with personal information. The image is analyzed to produce measurements of the user's facial characteristics. A user profile containing the image measurements and personal information is compared to two or more categories of reference data. For each category, one or more recommendations are produced according to the results of the comparison. The top recommendations are chosen according to a prioritization hierarchy and provided to the user.

20 Claims, 15 Drawing Sheets

(56) References Cited

U.S. PATENT DOCUMENTS

2011/0116691 A1  5/2011  Chung et al.
2011/0211047 A1  9/2011  Chhibber
2011/0263946 A1  10/2011 el Kaliouby et al.
2012/0008838 A1  1/2012  Guyon et al.
2012/0027269 A1  2/2012  Fidaleo et al.

* cited by examiner

| | | Relative Determination | | |
|---|---|---|---|---|
| | | High Risk | Medium Risk | Low Risk |
| Categories | Age | 4 | 7 | 10 |
| | Age + Skin Type | 3 | 6 | 9 |
| | Age + Skin Type + Geo/Climate | 3 | 5 | 8 |
| | Age + Skin Type + Diet | 1 | 4 | 7 |
| | Age + Skin Type + Hydration | 2 | 5 | 8 |
| | Age + Skin Type + Exercise | 2 | 5 | 8 |

METHOD FOR PROVIDING PERSONALIZED RECOMMENDATIONS

BACKGROUND

This relates to the personalized recommendation of products and services. By way of example but not limitation, the invention is described in the context of cosmetology, and specifically with respect to the cosmetic improvement of a person's face.

SUMMARY

In one embodiment, the present invention provides a process by which recommendations may be selected for a user. In a preferred embodiment, the invention may be used to provide personalized recommendations that are intended to improve a person's cosmetic appearance.

In a preferred embodiment, a user submits an image of her face along with personal information. Preferably, the personal information is submitted in the form of responses to a questionnaire. The image is analyzed to identify features of the user's face and to produce measurements of the facial features. A user profile comprising the image measurements and questionnaire responses is compared to previously-stored reference data. Specifically, the user profile is used to identify reference data in two or more categories. The user profile is then compared to the reference data in those categories. Depending on the results of the comparison, one or more recommendations are provided for each category. A prioritization hierarchy is then used to identify and select one or more of the recommendations to provide to the user.

Numerous variations may be practiced with the preferred embodiment. For example, several aspects of the preferred embodiment may be varied, including but not limited to the facial features that may be measured, the questions asked of the user, the responses solicited from the user, the number and types of categories, the quantity and quality of reference data, the number and types of recommendations provided for each category, the qualities of the prioritization hierarchy and the number of recommendations provided to the user.

BRIEF DESCRIPTION OF THE DRAWINGS

FIG. 14 illustrates a sample prioritization hierarchy.

DETAILED DESCRIPTION

A detailed illustrative embodiment of the present invention is disclosed herein. However, methods, techniques, processes, systems and operating structures in accordance with the present invention may be embodied in a wide variety of forms and modes, some of which may be quite different from those in the disclosed embodiment. Consequently, the specific functional and structural details disclosed herein are merely representative, yet in that regard, they are deemed to afford the best embodiment for purposes of disclosure and to provide a basis for the claims herein which define the scope of the present invention.

None of the terms used herein, including "category", "rank", "feature", "recommendation", "reference information" and "subset" are meant to limit the application of the invention. The terms are used to illustrate the preferred embodiment and are not intended to limit the scope of the invention. Similarly, the use of these terms is not meant to limit the application of the invention, as the invention is versatile and can be utilized in many applications, as will be apparent. Any reference made to a female user in the preferred embodiment is not intended to exclude male users. The following presents a detailed description of the preferred embodiment of the present invention with reference to the figures.

Figure 1:
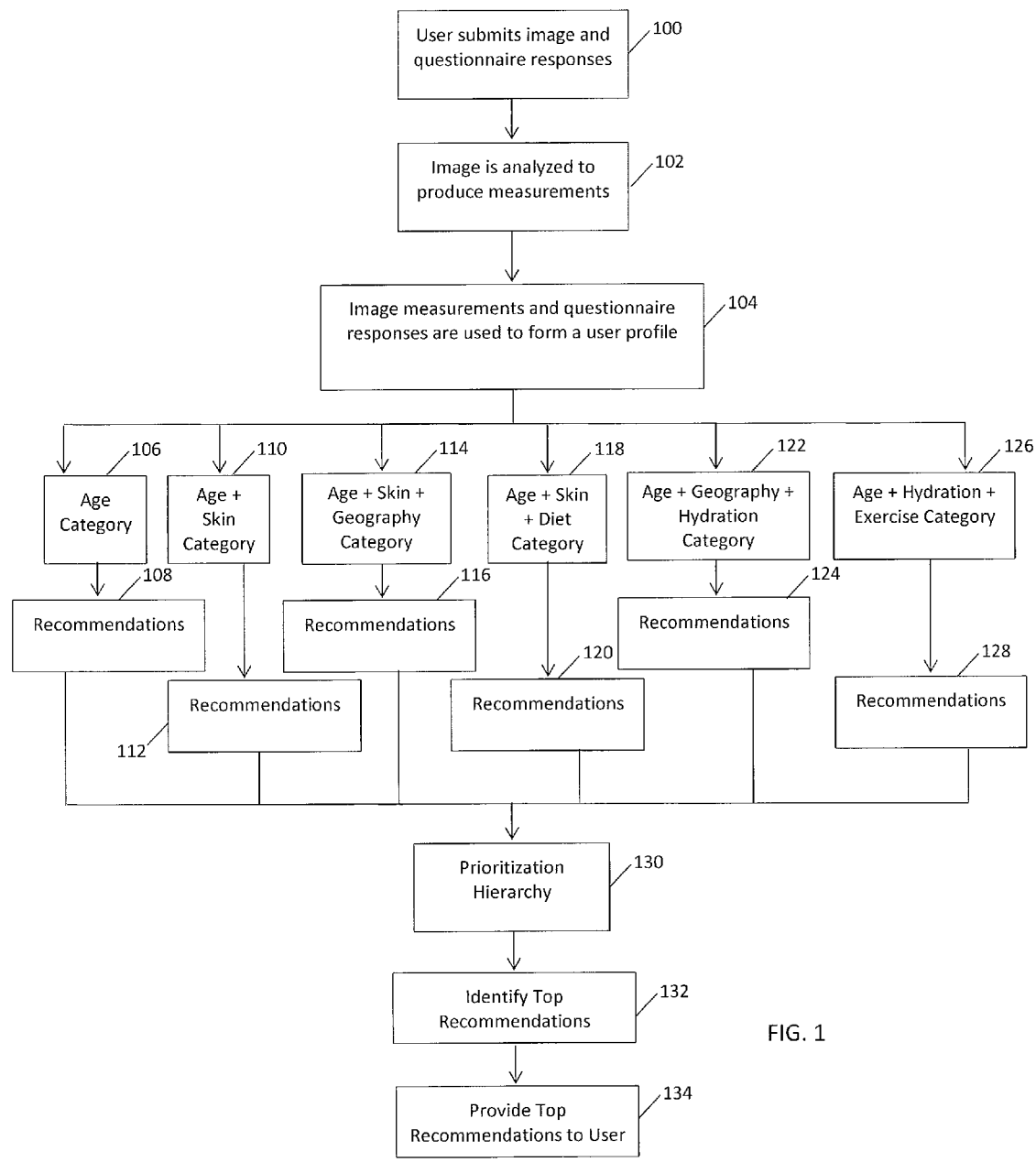
FIG. 1 illustrates a recommendation process.
Figure 2A:
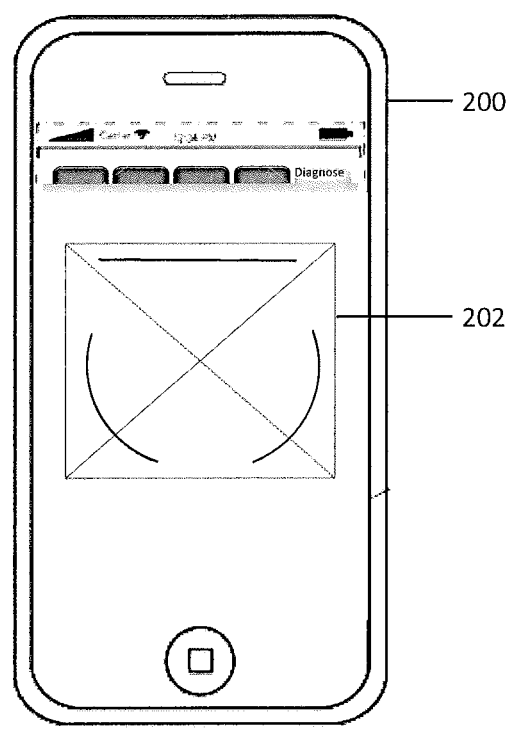
FIG. 2A illustrates a user interface.
Figure 2B:
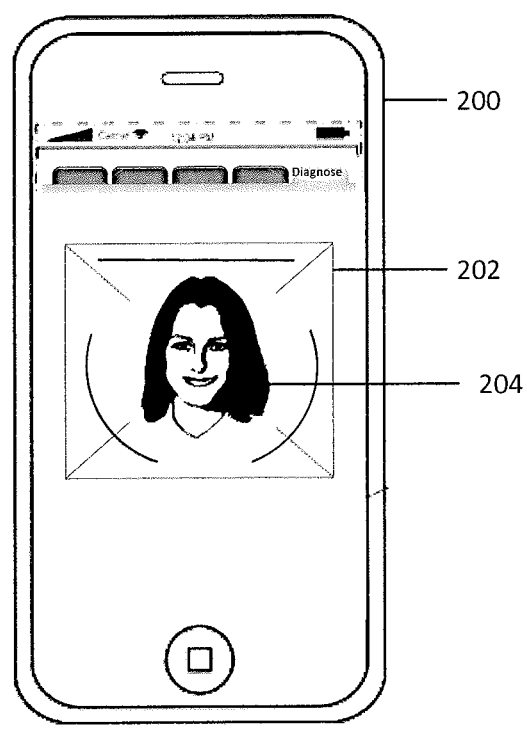
FIG. 2B illustrates a user interface.

FIG. 1 depicts a process for determining cosmetic-related recommendations to provide to a user. In step 100, a user submits an image of her face and responses to a questionnaire. While the preferred embodiment is disclosed using one image, more than one image of the user may be used without departing from the invention. FIG. 2A depicts the front side of a typical electronic device 200 used to capture a user's image and questionnaire responses. For example, an electronic device may be a mobile telephone, smart phone, tablet computer, personal digital assistant (PDA), laptop or other device, preferably with at least a camera, display, communication capability and a means of data entry. Photo guide 202 instructs the user where to place her face in the image. Using photo guide 202, the user is able to take an image of her face with preferred dimensions for use in the recommendation process. FIG. 2B depicts an image 204 of the user taken by electronic device 200. Preferably, image 204 is a digital image capable of transmission through a communications network.

Figure 3:
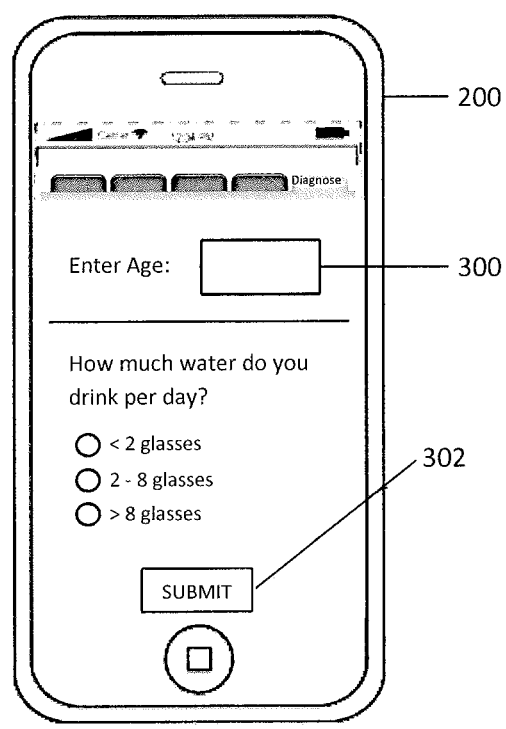
FIG. 3 illustrates an information form.

FIG. 3 depicts a questionnaire screen displayed on electronic device 200. A user is prompted to enter information via questions or prompts. For example, the text "Enter Age:" prompts the user to enter her age in box 300. As another example, the text "How much water do you drink per day?" prompts the user to select an appropriate response. Once the user has entered the desired responses, the user selects the "submit" button 302. One or more questions may be asked of the user, and the questionnaire may comprise one or more screens on electronic device 200. Preferably, the questions relate to the user's interest in skin care, the user's skin type, the user's age, the user's dietary habits, the user's location and climate, and the user's frequency of exercise. These and other topics may be used without departing from the invention.

Figure 4:
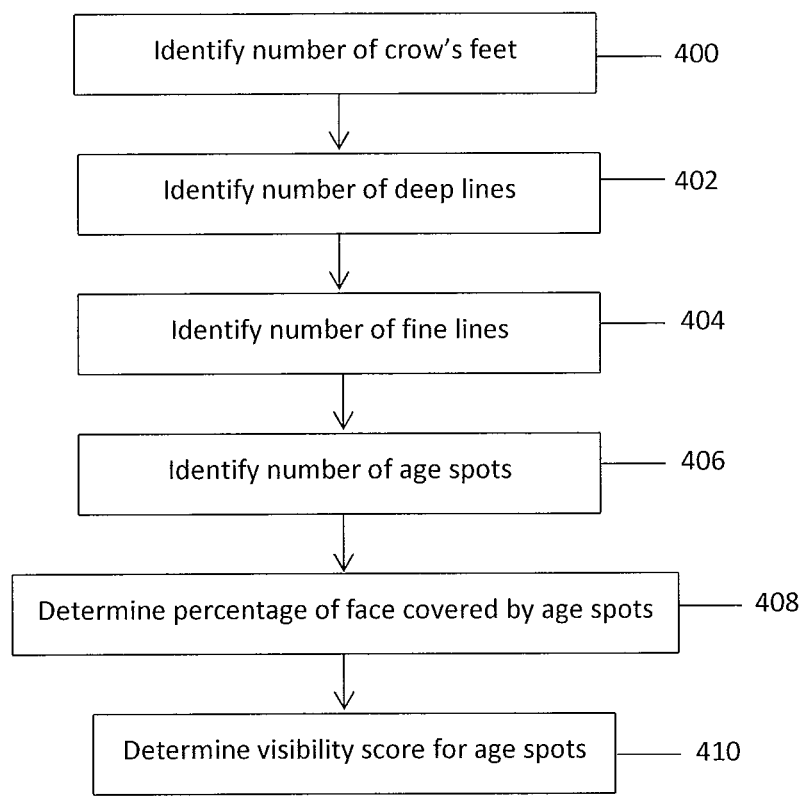
FIG. 4 illustrates an image analysis process.

Referring back to FIG. 1, once the user has submitted an image and questionnaire responses, the process proceeds to step 102. In step 102, the user's image is analyzed to produce measurements. FIG. 4 depicts steps used in the analysis of the user's image. Any sufficient method or means of image processing may be used to analyze the user's image to identify the facial characteristics and features of the user's face. In step 400, the user's image is analyzed to identify the number of crow's feet on the user's face. In step, 402, the user's image is analyzed to identify the number of deep lines. In step 404, the user's image is analyzed to identify the number of fine lines. In step 406, the user's image is analyzed to identify the number of age spots. In step 408, the image is analyzed to determine the percentage of the user's face that is covered by age spots. In step 410, the user's image is analyzed to determine a visibility score for the age spots on the user's face. Each of the foregoing analyses produces image measurements, such as the number of fine lines on the user's face. While the measurement of five features (number of crow's feet, number of deep lines, number of fine lines, number of age spots and the percent of a user's face covered by age spots) is disclosed, other facial characteristics and a different number of facial characteristics may be used without departing from the invention. For example, an image may be analyzed to determine the oiliness of the user's skin, the user's skin tone, the number of hyperpigmentation areas or the percentage of the user's face that is covered by hyperpigmentation areas. As further examples of measurements, analysis may include the number of spots on the user's face, pigment intensity, pigment darkness, pigment evenness, visibility of pores, the number of large pores, the number and characteristics of wrinkles, the location of wrinkles on the user's face, color of the user's lips, lip line curvature, lip border strength, lip line smoothness, lip fullness, acne lesion visibility, color of acne scars, visibility of acne scars, presence of melasma, percentage of the user's skin area covered by melasma, darkness of melasma, homogeneity of hyperpigmentation due to melasma, inflammation, diffused redness, ultraviolet damage, and radiance.

Referring back to FIG. 1, the image measurements from step 102 and the questionnaire responses from step 100 are used to form a user profile in step 104. Preferably, a user profile contains at least image measurements and questionnaire responses, but may contain additional information. In step 106, the user profile is used to locate reference information within an "age" category. Preferably, reference information comprises previously stored data about a population. For example, reference information may comprise previously stored user images from other users, questionnaire responses from other users and image measurements relating to other users. Alternatively, reference information may comprise statistical data compiled by public or private surveys, or made available by a source such as the United States Census Bureau.

Figure 5:
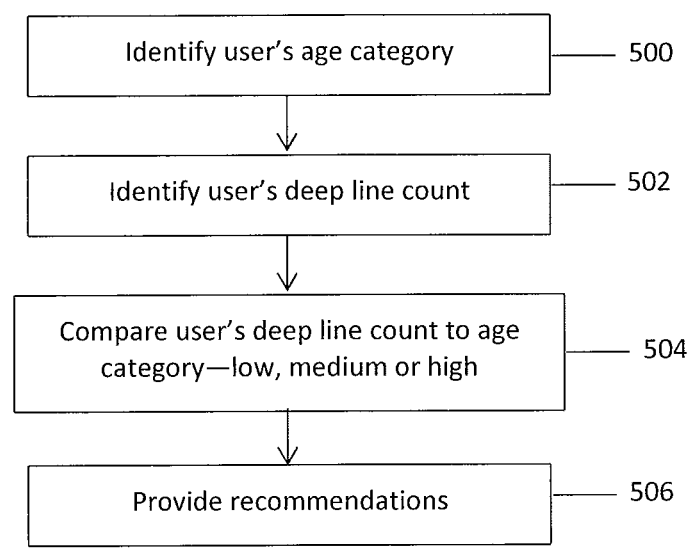
FIG. 5 illustrates steps in the recommendation process.

FIG. 5 depicts a process to use a user profile to locate reference information within an "age" category. In step 500, the user's age is identified within the user profile. The user's age, which was submitted by the user as a questionnaire response, is used to locate reference information within the user's "age" category. For example, the user's "age" category may comprise information from a population of people that are the same age as the user. In step 502, the user's deep line count is identified within the user profile. In step 504, the user's deep line count is compared to reference information within the user's "age" category, and the user's relative deep line count is determined. For example, the user's relative deep line count may be determined to be low, medium or high. As an alternative to the low/medium/high determination, a more or less detailed determination may be made.

Referring back to FIG. 1, the results of step 106 are used to provide one or more recommendations in step 108. Referring to FIG. 5, depending on the determination made in step 504, one or more recommendations are provided in step 506. For example, one recommendation may be provided if a user is found to have a low deep line count for the user's "age" category, and a different recommendation may be provided if the user is found to have a high deep line count for the user's "age" category. In one embodiment, a table of recommendations is arranged by category and determination. Providing one or more recommendations in steps 108 and 506 may be accomplished by consulting the table and identifying recommendations for the specific category and determination.

Recommendations may relate to skincare, lifestyle, products or other factors that affect a person's appearance. An exemplary recommendation would be for the user to drink more water. In one embodiment, a recommendation may also suggest or instruct the user to obtain professional services. For example, a recommendation may be for the user to undergo a microdermabrasion procedure or a laser treatment. In another embodiment, a recommendation may contain a referral to a qualified practitioner or specialist. The user may be referred to such a service provider according to criteria such as proximity to the user, a quality rating of the service provider or a combination thereof.

Recommendations may be produced by or acquired from various sources. In one embodiment, one or more databases may store a collection of recommendations and be used to provide the recommendations in the previously described processes. In another embodiment, third party sources of content may be used to provide recommendations. Such third party content may be tagged to indicate image measurements and questionnaire responses for which the content and recommendations are appropriate. Third party content and recommendations are preferably screened before being provided to a user.

Figure 6:
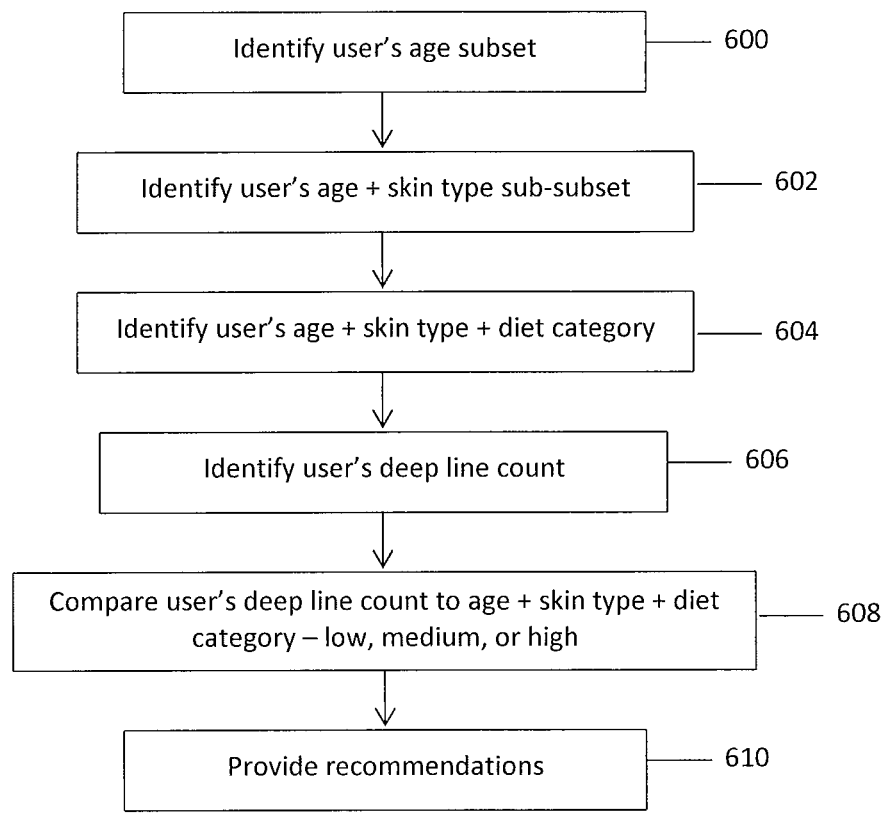
FIG. 6 illustrates steps in the recommendation process.

Referring to step 118 in FIG. 1, the user profile is used to locate reference information within an "age, skin type and diet" category. FIG. 6 depicts a process to use a user profile to locate reference information within an "age, skin type and diet" category. In step 600, the user's age, which was submitted by the user as a questionnaire response, is used to locate reference information within the user's "age" subset. For example, the user's "age" subset may comprise information from a population of people that are the same age as the user. In step 602, the user's skin type is compared to the reference information within the user's "age" subset to determine the user's "age and skin" type sub-subset. A user's skin type may be submitted by the user as a questionnaire response and/or measured using image analysis. In step 604, the user's diet, which was submitted by the user as a questionnaire response, is compared to the reference information within the user's "age and skin type" sub-subset in order to determine the user's "age, skin type and diet" category. In step 606, the user's deep line count is identified within the user profile. In step 608, the user's deep line count is compared to reference information within the user's "age, skin type and diet" category, and the user's relative deep line count is determined. For example, the user's relative deep line count may be determined to be low, medium or high. As an alternative to the low/medium/high determination, a more or less detailed determination may be made.

Referring back to FIG. 1, the results of step 118 are used to provide one or more recommendations in step 120. Referring to FIG. 6, depending on the determination made in step 608, one or more recommendations are provided in step 610. For example, one recommendation may be provided if a user is found to have a low deep line count for the user's "age, skin type and diet" category, and a different recommendation may be provided if the user is found to have a high deep line count for the user's "age, skin type and diet" category.

Referring back to FIG. 1, by applying the principles of the previous examples, the user profile is used to locate reference information in various categories, and the user's image measurements are compared to the reference information. In step 110, the user profile is used to locate reference information in an age and skin type category, and the user's image measurements are compared to the reference information within the age and skin type category. In step 114, the user profile is used to locate reference information in an age, skin type and geography category, and the user's image measurements are compared to the reference information within the age, skin type and geography category. In step 122, the user profile is used to locate reference information in an age, geography and hydration category, and the user's image measurements are compared to the reference information within the age, geography and hydration category. In step 126, the user profile is used to locate reference information in an age, hydration and exercise category, and the user's image measurements are compared to the reference information within the age, hydration and exercise category.

The results of each comparison are used to provide one or more recommendations for each comparison. Specifically, the results of the comparison in step 110 are used to provide one or more recommendations in step 112. The results of the comparison in step 114 are used to provide one or more recommendations in step 116. The results of the comparison in step 122 are used to provide one or more recommendations in step 124. The results of the comparison in step 126 are used to provide one or more recommendations in step 128.

Figure 7:
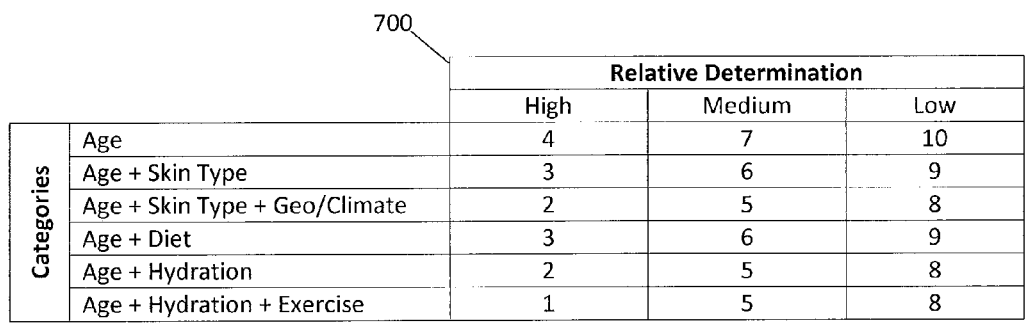
FIG. 7 illustrates a prioritization hierarchy.

In step 130, a prioritization hierarchy is used to select one or more of the recommendations provided in steps 108, 112, 116, 120, 124 and 128. FIG. 7 depicts an exemplary prioritization hierarchy in grid 700. FIG. 7 is illustrative, and the categories and determinations in grid 700 are only exemplary. Grid 700 may be used to determine which recommendations to provide to the user. Specifically, a priority ranking is identified by cross-referencing a user's relative determination within a category. For example, if a user is found to have a high deep line count for the user's "age" category, the recommendation from the "age" category is given a priority ranking of 4. As another example, if a user is found to have a low deep line count for the user's age, hydration and exercise category, the recommendation from the age, hydration and exercise category is given a priority ranking of 8. A recommendation with a higher priority ranking (i.e., a lower number on grid 700) is given preference over a recommendation with a lower priority ranking (i.e., a higher number on grid 700).

Referring to FIG. 1, in step 130, the prioritization hierarchy is applied to the recommendations provided in steps 108, 112, 116, 120, 124 and 128. In step 132, the one or more recommendations with the highest priority rankings are identified. For example, if three recommendations are eventually to be provided to the user, then the three recommendations with the highest priority rankings are identified. In step 134, the recommendation(s) identified in step 132 are provided to the user. Preferably, the recommendations are provided via a communications network to the user on the electronic device used to submit the image and questionnaire responses, but any sufficient means or method of communicating the recommendations to the user may be used.

In another embodiment, an order of priority may be applied to the categories described in steps 106, 110, 114, 118, 122 and 126. For example, the results of a comparison within the "age" category may be given priority over the results of a comparison in the "age and skin type" category. In this embodiment, a prioritization hierarchy may be applied to the categories to determine the order of priority, or the order may be predetermined according to alternative criteria.

Figure 8:
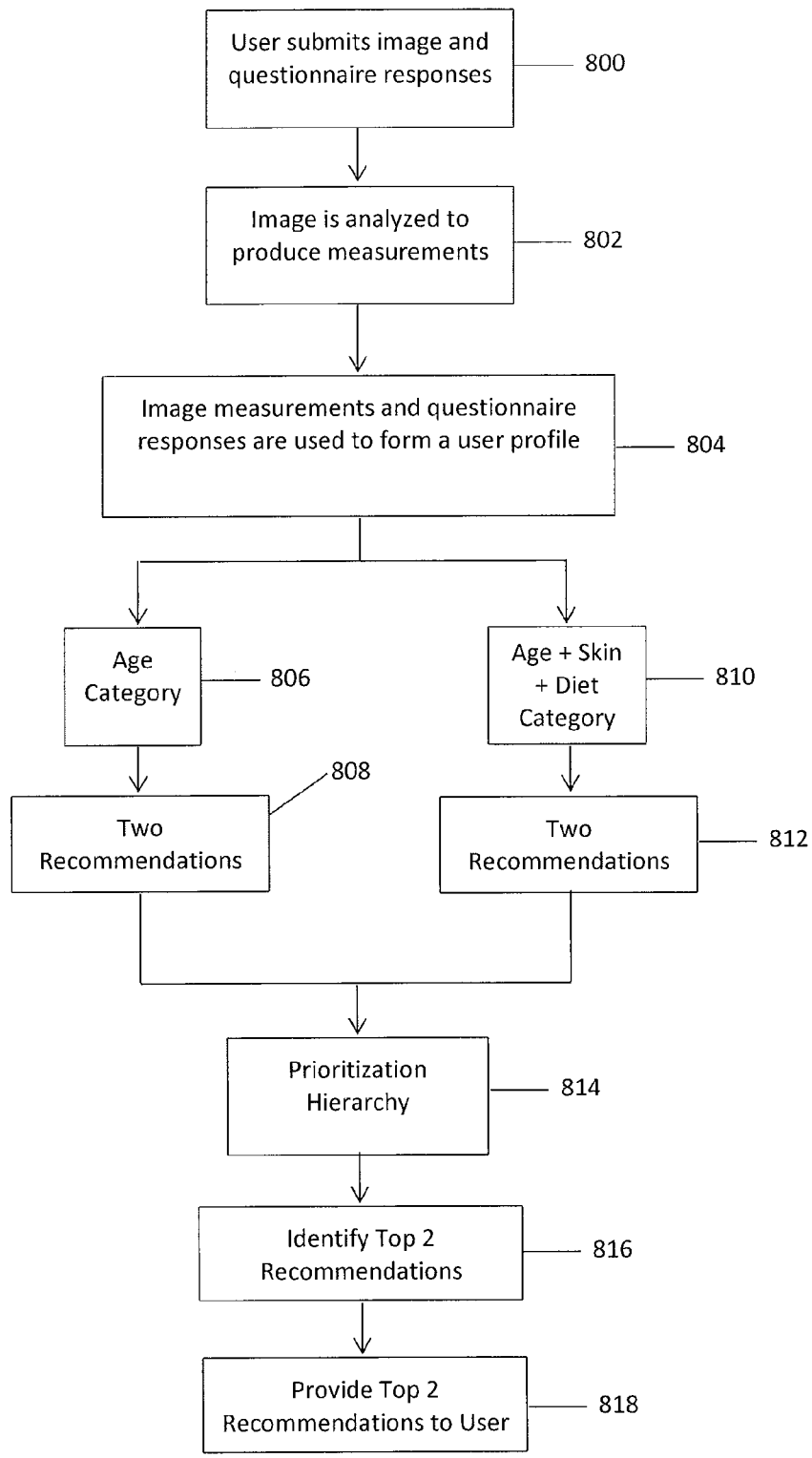
FIG. 8 illustrates a sample recommendation process.
Figure 9:
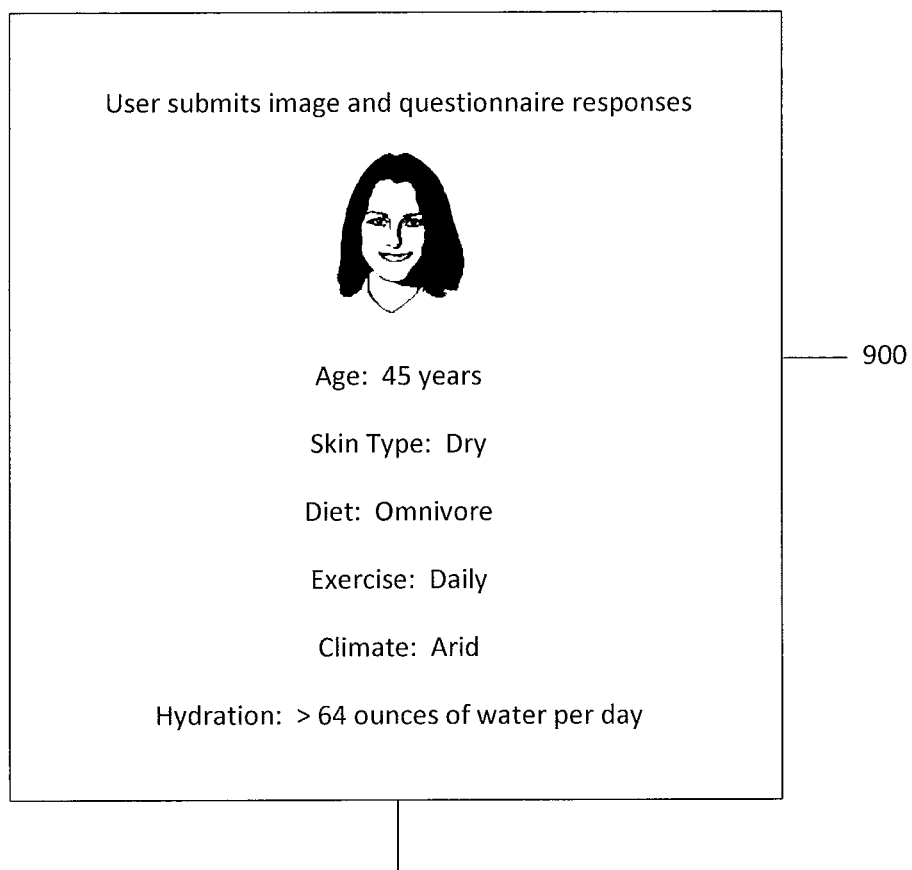
FIG. 9 illustrates a sample set of user data.

By way of example and not limitation, and to more clearly describe the preferred embodiment, a recommendation process will now be explained using a sample set of user data, a sample set of population data, a sample set of categories and a sample prioritization hierarchy. Referring to FIG. 8, in step 800, a user submits an image of her face along with questionnaire responses. The user submission 900 is depicted in FIG. 9. The user submission 900 contains an image of the user's face and information about the user. Specifically, the user is 45 years old, has dry skin, is an omnivore, exercises daily, lives in an arid climate and consumes more than 64 ounces of water per day.

Figure 10:
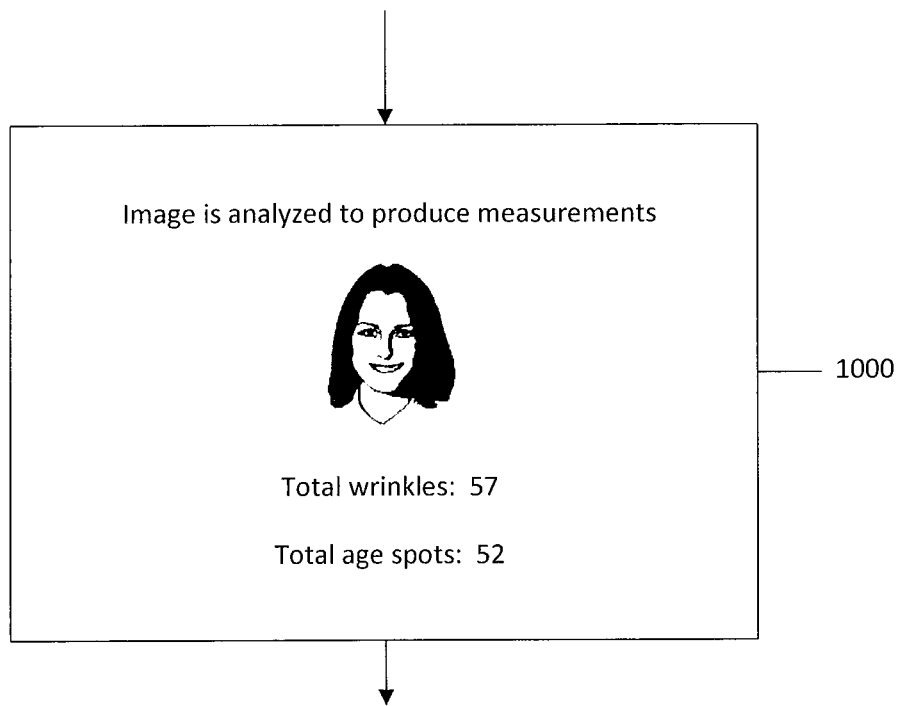
FIG. 10 illustrates a sample set of user data.

Referring back to FIG. 8, the user's image is analyzed at step 802 to produce measurements corresponding to the user's facial characteristics. Measurements are depicted in FIG. 10 at block 1000. Specifically, a computer analysis of the user's face determined that the user has 57 total wrinkles and 52 age spots. Although measurements for wrinkles and age spots are disclosed, additional measurements may be taken.

Figure 11:
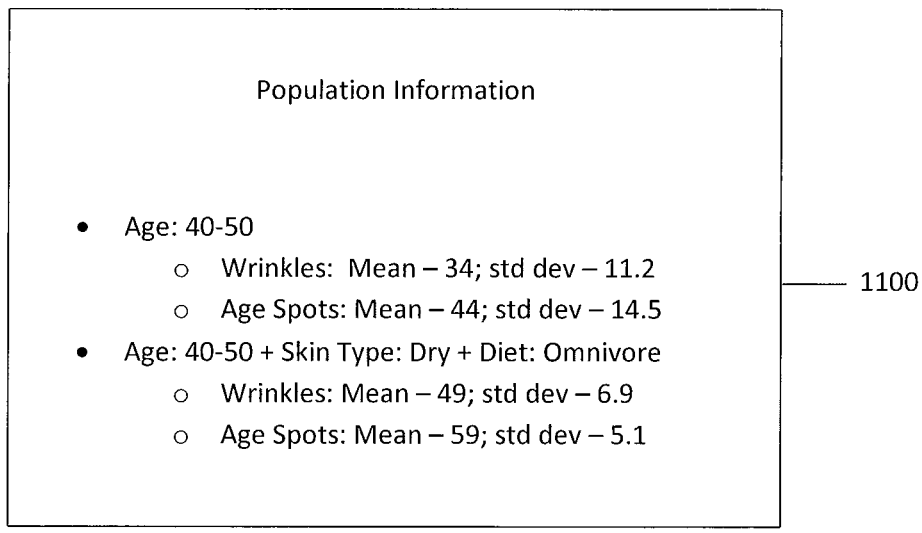
FIG. 11 illustrates a sample set of population data.

Referring back to FIG. 8, the user's questionnaire responses and image measurements are used to form a user profile in step 804. In steps 806 and 810, the user profile is used to locate reference information. As explained earlier, reference information may include data acquired from a population. The reference information for this specific example is shown in FIG. 11 at block 1100. The reference information includes data acquired from a population of people with a similar age as the user (i.e., within 5 years of age). In this example, the average number of wrinkles for the population is 34, and the standard deviation for the number of wrinkles for the population is 11.2. The average number of age spots for the population is 44, and the standard deviation for the population is 14.5. The reference information depicted in block 1100 also includes data acquired from a population of people with a similar age as the user, a dry skin type and an omnivore diet. For this particular population, the average number of wrinkles is 49 with a standard deviation of 6.9. The average number of age spots for this particular population is 59 with a standard deviation of 5.1.

Figure 12:
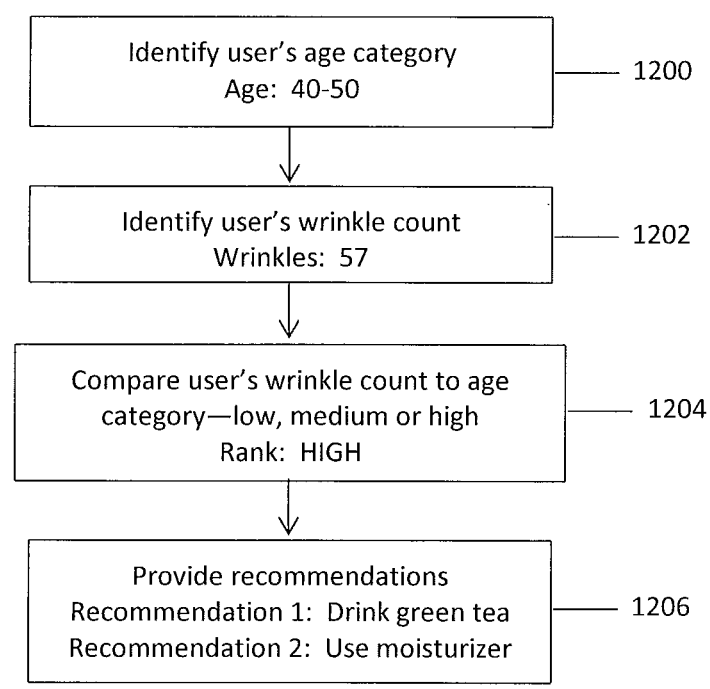
FIG. 12 illustrates steps in the sample recommendation process.

Referring back to FIG. 8, in step 806, the user profile is used to locate the reference information in the "age" category, as depicted in step 1100 of FIG. 11. FIG. 12 depicts a process to compare the user's image measurements to the reference information within the "age" category. In step 1200, the user's age is identified from the user profile. The user's age, which was submitted by the user as a questionnaire response, is used to locate the reference information within the user's "age" category. In this example, the user's "age" category comprises information from a population of people that are 40 to 50 years old. In step 1202, the user's wrinkle count is identified from the user profile as 57 wrinkles. In step 1204, the user's wrinkle count is compared to the reference information within the user's "age" category. Because the user's wrinkle count of 57 is greater than one standard deviation (11.2) away from the average number of wrinkles for the population in the "age" category (34), the user's relative wrinkle count is determined to be high in step 1204.

Referring back to FIG. 8, the results of step 806 are used to provide two recommendations in step 808. Referring to FIG. 12, two recommendations are provided in step 1206. Specifically, the first recommendation is to drink green tea, and the second recommendation is to use moisturizer. These two recommendations are provided because the user was determined to have a high relative wrinkle count for her age in step 1204. Preferably, the two recommendations provided would be different for a user with a medium or low wrinkle count for her "age" category.

Figure 13:
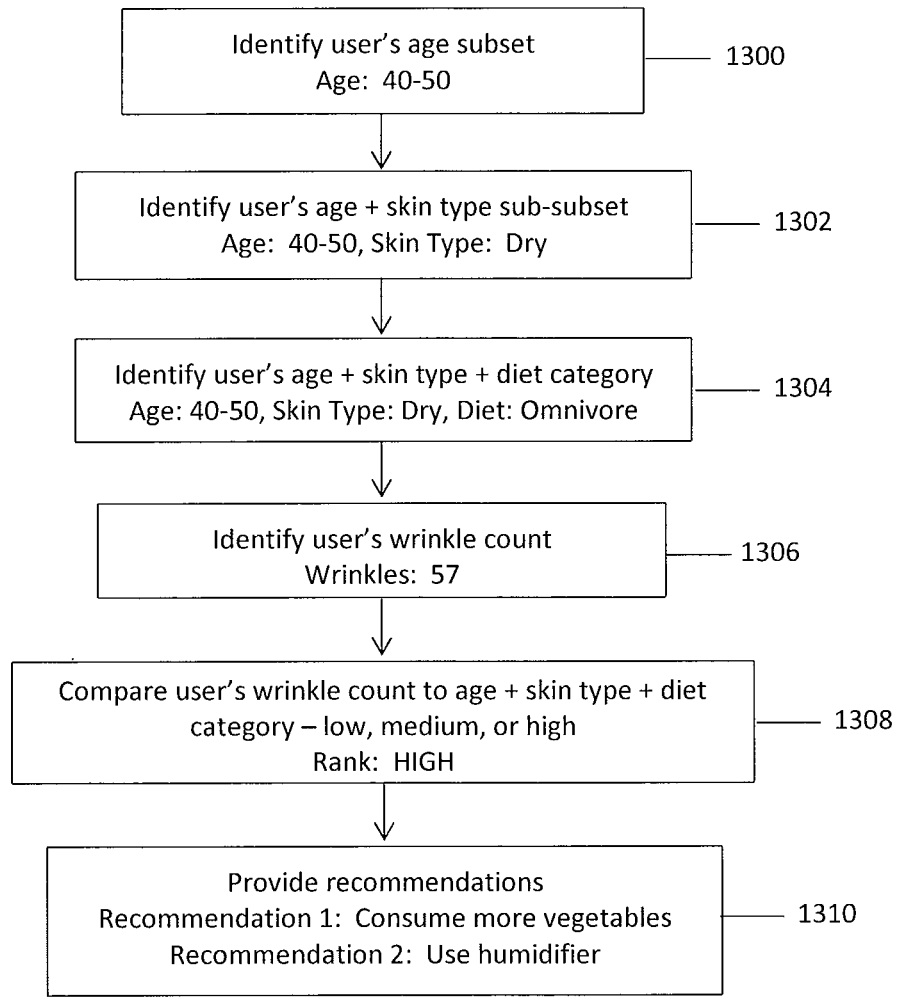
FIG. 13 illustrates steps in the sample recommendation process.

Referring to step 810 in FIG. 8, the user profile is used to locate reference information within an "age, skin type and diet" category. FIG. 13 depicts a process to use the user profile to locate reference information within her "age, skin type and diet" category. In step 1300, the user's age (i.e., 45 years old) is used to locate the reference information within the user's "age" subset. In this example, the user's "age" subset comprises information from a population of people that are 40 to 50 years old. In step 1302, the user's skin type (i.e., dry) is used to locate the reference information within the user's "age" subset that also falls within the user's "age and skin type" sub-subset. In step 1304, the user's diet (i.e., omnivore) is used to locate the reference information within the user's "age and skin type" sub-subset that also falls within the user's "age, skin type and diet" category. Specifically, the user's "age, skin type and diet" category has reference information from a population that is 40 to 50 years old with dry skin and an omnivore diet. In step 1306, the user's wrinkle count is identified from the user profile. In step 1308, the user's deep line count is compared to the reference information within the user's "age, skin type and diet" category, and the user's relative wrinkle count is determined. Because the user's wrinkle count of 57 is greater than one standard deviation (6.9) away from the average number of wrinkles for the "age, skin type and diet" category (49), the user's wrinkle count for this category is determined to be high.

Referring back to FIG. 8, the results of step 810 are used to provide two recommendations in step 812. Referring to FIG. 13, two recommendations are provided in step 1310. Specifically, the first recommendation is to consume more vegetables, and the second recommendation is to use a humidifier. These two recommendations are provided because the user was determined to have a high relative wrinkle count for her "age, skin type and diet" category in step 1308. Preferably, the two recommendations provided would be different for a user with a medium or low wrinkle count for her "age, skin type and diet" category.

Additional comparisons are performed, but only two comparisons are shown, in steps 806 and 810. The additional comparisons are performed by applying the principles disclosed with respect to the comparisons in steps 806 and 810. Recommendations for each of the additional comparisons are provided by applying the principles disclosed with respect to steps 808 and 812.

In step 814 of FIG. 8, a prioritization hierarchy is used to select two of the recommendations provided in steps 808 and 812. FIG. 14 depicts a prioritization hierarchy in grid 1400. FIG. 14 is illustrative, and the categories and determinations in grid 1400 are only exemplary. Grid 1400 is used to determine which recommendations to provide to the user. Specifically, a priority ranking is identified by cross-referencing the user's relative determination within each category. In this example, the user was found to have a high wrinkle count for the user's "age" category. According to grid 1400, the recommendations from the "age" category are given a priority ranking of 4. The user was also found to have a high wrinkle count for the user's "age, skin type and diet" category. According to grid 1400, the recommendations from the "age, skin type and diet" category are given a priority ranking of 1. A recommendation with a higher priority ranking (i.e., a lower number on grid 1400) is given preference over a recommendation with a lower priority ranking (i.e., a higher number on grid 1400). Therefore, the recommendations corresponding to the user's "age, skin type and diet" category are ranked higher than the recommendations corresponding to the user's "age" category. In step 816 of FIG. 8, the two recommendations corresponding to the user's "age, skin type and diet" category are identified as the top two recommendations. Finally, in step 818, the top two recommendations are provided to the user. Accordingly, the user will receive the recommendations to consume more vegetables and use a humidifier.

It should be noted that, in addition to the recommendations provided to the user, the image measurements, reference information and the results of any comparisons may also be provided to the user. In another embodiment, all of the recommendations provided in steps 108, 112, 116, 120, 124 and 128 may be provided to the user. In this embodiment, emphasis may be placed on the recommendations identified in step 132.

It should be noted that recommendations may be provided to a user on an ongoing basis. For example, relevant recommendations may be provided on a periodic basis (daily, weekly, monthly, etc.).

In an alternative embodiment, the user's profile is used to identify reference information in two or more categories. The user's image measurements are then used to determine a relative ranking within each category (for example, a high wrinkle count within an "age" category), as described earlier. Recommendations are provided for the highest ranked category or categories. These recommendations are then provided to the user.

In yet another alternative embodiment, two or more categories are selected according to a prioritization model. Then a user profile is compared to reference information in the selected categories, and recommendations are provided for each category. Optionally, a prioritization hierarchy is applied to select from the recommendations. The highest ranked recommendation(s) are then provided to the user.

In another embodiment, after the user has received recommendations pursuant to the foregoing examples, the user follows the recommendations for a period of time and then submits a second set of one or more images. The subsequent images depict any changes to the user's facial features after following the recommendations. For example, the user may have consumed more vegetables and used a humidifier for a period of time, and as a result, the user's wrinkle count may have decreased. Along with the second set of images, the user may submit a second set of questionnaire responses. The second set of images and questionnaire responses may then be processed in the same manner as described earlier. Specifically, steps 100, 102, 104, 106, 108, 110, 112, 114, 116, 118, 120, 122, 124, 126, 128, 130, 132 and 134 may be repeated, such that a second round of recommendations are produced for the user. Image measurements taken from the second set of photographs may be compared to the image measurements taken from the first set of photographs, and the results of the comparison may be provided to the user.

In another embodiment, a user image is submitted and analyzed to produce measurements in accordance with the foregoing principles. The measurements are compared to reference data such as data about a population. For each facial feature or characteristic, the measurements are used to calculate a severity rating. The severity ratings are then used to identify the facial feature or characteristic for which the measurement deviates the furthest from the average for the population data. As an example, the user depicted in FIG. 10 has 57 total wrinkles and 52 total age spots. The population data is depicted in FIG. 11. Specifically, for people of age 40-50 in the population, the average number of wrinkles is 34, the standard deviation for the number of wrinkles is 11.2, the average number of age spots is 44, and the standard deviation for age spots is 14.5. In this example, the user's wrinkle count is greater than one standard deviation above the average number of wrinkles for the population, and the user's age spot count is less than one standard deviation above the average number of age spots for the population. In this embodiment, the user's wrinkles are determined to be the facial feature or characteristic for which the severity rating is highest and for which the user would benefit the most from treatment. Recommendations to improve wrinkles are then provided to the user in accordance with the foregoing principles.

In a related embodiment, the user of the previous example may follow the recommendations and improve her wrinkle count. The user may then submit one or more images depicting her improved facial appearance. The new images are analyzed and measured in accordance with the foregoing principles. The measurements are compared to the population data to produce severity ratings for each facial feature or characteristic. It may be determined that the user's new wrinkle count is lower overall, but is still more than one standard deviation above the average for the population. As an example, the user may now have a total wrinkle count of 47. The user's wrinkles still have the highest severity rating, and recommendations to the user may continue to focus on wrinkles. In another embodiment, the user's improvement in wrinkle count may be considered when determining which recommendations to make. Specifically, because the user's wrinkle count is improving, new recommendations may emphasize another facial feature or characteristic with a lower severity rating than the user's wrinkles. For example, although the user's wrinkle count of 47 is still more than one standard deviation above the average for the population, the wrinkle count dropped by 10 since the initial evaluation due to treatment. Although the user's number of age spots is less than one standard deviation above the average for her age, recommendations relating to age spots may be provided to the user. In other words, although the user's wrinkle count has the highest severity rating, the improvement to the user's wrinkle count may indicate that recommendations should be given for a different facial feature or characteristic with a lower severity rating.

In another embodiment, a severity rating may be calculated by incorporating questionnaire responses from the user. For example, the user may be prompted to identify the facial features she would like to improve the most, and to rank the features in order of preference. The user's responses may be used to assign severity ratings to the user's facial features. Severity ratings may also be assigned by incorporating a combination of the user's questionnaire responses and measurements produced from the user's image.

While the present invention has been described with reference to the preferred embodiment, which has been set forth in considerable detail for the purposes of making a complete disclosure of the invention, the preferred embodiment is merely exemplary and is not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

The invention claimed is:

1. A computerized method for providing prioritized skin treatment recommendations to a user, comprising:
   receiving from an electronic device image data of a user's face, wherein the electronic device comprises a camera, a display, and a user interface, wherein the image data is obtained via said camera, and wherein said electronic device presents on the display a photo guide indicating how the user's face should be positioned with respect to the camera when the image data is obtained;
   receiving from the electronic device informational data about the user;
   transforming via a computer said image data via image processing into measurements in order to identify at least two skin characteristics of the user from the received image data;
   calculating a severity rating for each of the at least two user skin characteristics by:
      selecting a subset of stored population information which matches at least one user informational data, wherein the stored population information comprises measurements for at least two skin characteristics of a population of the same type as the at least two skin characteristics of the user, wherein each of the measurements for the at least two population skin characteristics is categorized according to informational data about the population, and wherein each of the measurements for the at least two population skin characteristics comprises a mean value and a standard deviation value;
      comparing each of the measurements of the at least two user skin characteristics to the measurements of same type population skin characteristic in the selected population information;
      determining by how much each of the measurements of the at least two user skin characteristics deviates from the mean value and the standard deviation value of the same type population skin characteristic in the selected population information;
      assigning higher severity rating to the user skin characteristic which deviates furthest than at least one standard deviation of the same type population skin characteristic in the selected population information;
   for a subset of the user skin characteristics with the highest severity rating, selecting one or more skin treatment recommendations from stored skin treatment recommendations based on the subset of the user skin characteristic with the highest severity rating and at least one user informational data; and
   providing to the electronic device the selected one or more skin treatment recommendations.

2. The method of claim 1, further comprising: receiving data of multiple images of the user's face.

3. The method of claim 1, wherein the image data comprises a digital image.

4. The method of claim 1, wherein the subset of recommendations are provided to the user via the network.

5. The method of claim 1, wherein at least one of the at least two user skin characteristics and the at least two population skin characteristics comprise one or more of: number of wrinkles, number of age spots, quality of age spots, percentage of facial area covered by age spots, number of hyperpigmentation spots, quality of hyperpigmentation spots, percentage of facial area affected by hyperpigmentation spots, number of crow's feet, number of fine lines, number of deep lines, oiliness of skin, dryness of skin, pigment intensity, pigment darkness, pigment evenness, visibility of pores, number of large pores, lip color, lip line curvature, lip border strength, lip line smoothness, lip fullness, acne lesion visibility, color of acne scars, visibility of acne scars, presence of melasma, percentage of facial area covered by melasma, darkness of melasma, ultraviolet damage, and skin tone.

6. The method of claim 1, wherein at least one of the user informational data and population informational data relates to one or more factors that affect skin.

7. The method of claim 6, wherein at least one of the user informational data and the population informational data comprises information relating to one or more of: age, skin type, skin care, water consumption, exercise frequency, diet, location, and climate.

8. The method of claim 1, wherein the selected one or more skin treatment recommendations comprise one or more of: skincare recommendations, lifestyle recommendations, product recommendations, service recommendations, professional skin service recommendations, and referrals.

9. The method of claim 1, further comprising: storing the user informational data and the at least two skin characteristics of the user.

10. The method of claim 1, further comprising:
receiving a subsequent image data of the user's face via the network;
receiving subsequent informational data about the user via the network;
transforming via the computer said subsequent image data via image processing into subsequent measurements in order to identify subsequent at least two skin characteristics of the user from the subsequent image data;
calculating via said computer a subsequent severity rating for each of the subsequent at least two user skin characteristics;
for a subset of the subsequent at least two user skin characteristics with the highest severity rating, providing one or more skin treatment recommendations to the user.

11. The method of claim 10, wherein the subsequent at least two user skin characteristics comprise one or more of: number of wrinkles, number of age spots, quality of age spots, percentage of facial area covered by age spots, number of hyperpigmentation spots, quality of hyperpigmentation spots, percentage of facial area affected by hyperpigmentation spots, number of crow's feet, number of fine lines, number of deep lines, oiliness of skin, dryness of skin, pigment intensity, pigment darkness, pigment evenness, visibility of pores, number of large pores, lip color, lip line curvature, lip border strength, lip line smoothness, lip fullness, acne lesion visibility, color of acne scars, visibility of acne scars, presence of melasma, percentage of facial area covered by melasma, darkness of melasma, ultraviolet damage, and skin tone.

12. The method of claim 10, further comprising:
providing a first comparative analysis of the user informational data and the user subsequent informational data; and
providing a second comparative analysis of the at least two user skin characteristics and subsequent at least two user skin characteristics.

13. The method of claim 12, further comprising: providing the first comparative analysis and the second comparative analysis to the user.

14. The method of claim 1, wherein the stored skin treatment recommendations comprise a table of recommendations arranged by type of skin characteristic and informational data.

15. The method of claim 1, further comprising:
storing the measurements of the at least two user skin characteristics;
receiving a subsequent image data of the user's face via the network;
transforming via the computer said image data via image processing into subsequent measurements in order to identify at least two subsequent skin characteristics of the user from the subsequent image data;
calculating via said computer a subsequent severity rating for each of the at least two subsequent user skin characteristics;
comparing the measurements of the at least two stored user skin characteristics with the measurements of the at least two subsequent user skin characteristics;
for a subset of the subsequent user skin characteristics with the highest subsequent severity rating, determining whether there is an improvement between subsequent user skin characteristics with the highest subsequent severity rating and the stored user skin characteristics of the same type;
if there is no improvement, providing one or more skin treatment recommendations to the user based on the subset of the subsequent user skin characteristics with the highest severity rating; and
if there is an improvement, providing one or more skin treatment recommendations to the user based on subsequent user skin characteristics with severity rating lower than the subsequent user skin characteristic with the highest severity rating.

16. A computerized method for providing prioritized skin treatment recommendations to a user, comprising:
receiving from an electronic device image data of a user's face, wherein the electronic device comprises a camera and a display, wherein the image data is obtained via said camera, and wherein said electronic device presents on the display a photo guide indicating how the user's face should be positioned with respect to the camera when the image data is obtained;
transforming via a computer said image data via image processing into measurements in order to identify at least two skin characteristics of the user from the received image data;
calculating a severity rating for each of the at least two user skin characteristics by:
accessing stored population information comprising measurements for at least two skin characteristics of a population of the same type as the at least two skin characteristics of the user, wherein each of the measurements for the at least two population skin characteristics comprises a mean value and a standard deviation value;
comparing each of the measurements of the at least two user skin characteristics to the measurements of same type population skin characteristic;
determining by how much each of the measurements of the at least two user skin characteristics deviates from the mean value and the standard deviation value of the same type population skin characteristic;
assigning higher severity rating to the user skin characteristic which deviates furthest than at least one standard deviation of the same type population skin characteristic; and for a subset of the user skin characteristics with the highest severity rating, selecting or more skin treatment recommendations from stored skin treatment recommendations based on the subset of the user skin characteristic with the highest severity rating; and providing to the electronic device the selected one or more skin treatment recommendations.

17. The method of claim 16, further comprising:

storing the measurements of the at least two user skin characteristics;

receiving a subsequent image data of the user's face via the network;

transforming via a computer said image data via image processing into measurements in order to identify at least two subsequent skin characteristics of the user from the subsequent image data;

calculating via said computer a subsequent severity rating for each of the at least two subsequent user skin characteristics;

comparing the measurements of the at least two stored user skin characteristics with the measurements of the at least two subsequent user skin characteristics;

for a subset of the subsequent user skin characteristics with the highest subsequent severity rating, determining whether there is an improvement between subsequent user skin characteristics with the highest subsequent severity rating and the stored user skin characteristics of the same type;

if there is no improvement, providing one or more skin treatment recommendations to the user based on the subset of the subsequent user skin characteristics with the highest severity rating; and if there is an improvement, providing one or more skin treatment recommendations to the user based on subsequent user skin characteristics with severity rating lower than the subsequent user skin characteristic with the highest severity rating.

18. The method of claim 16, wherein at least one of the at least two user skin characteristics and the at least two population skin characteristics comprise one or more of: number of wrinkles, number of age spots, quality of age spots, percentage of facial area covered by age spots, number of hyperpigmentation spots, quality of hyperpigmentation spots, percentage of facial area affected by hyperpigmentation spots, number of crow's feet, number of fine lines, number of deep lines, oiliness of skin, dryness of skin, pigment intensity, pigment darkness, pigment evenness, visibility of pores, number of large pores, lip color, lip line curvature, lip border strength, lip line smoothness, lip fullness, acne lesion visibility, color of acne scars, visibility of acne scars, presence of melasma, percentage of facial area covered by melasma, darkness of melasma, ultraviolet damage, and skin tone.

19. The method of claim 16, wherein the selected one or more skin treatment recommendations comprise one or more of: skincare recommendations, lifestyle recommendations, product recommendations, service recommendations, professional skin service recommendations, and referrals.

20. The method of claim 16, wherein said electronic device is selected from the group consisting of a mobile telephone, a smart phone, a tablet computer, a personal digital assistant, and a laptop.

* * * * *

UNITED STATES PATENT AND TRADEMARK OFFICE
CERTIFICATE OF CORRECTION

PATENT NO. : 9,842,358 B1
APPLICATION NO. : 13/527578
DATED : December 12, 2017
INVENTOR(S) : Christopher Butler and Brittania Boey Page 1 of 1

It is certified that error appears in the above-identified patent and that said Letters Patent is hereby corrected as shown below:

In the Claims

In Claim 16, at Column 13, Line 2, after the word "selecting" insert --one--.

Signed and Sealed this
Sixth Day of June, 2023

Katherine Kelly Vidal
*Director of the United States Patent and Trademark Office*